US009760327B2

(12) United States Patent
Naik et al.

(10) Patent No.: US 9,760,327 B2
(45) Date of Patent: Sep. 12, 2017

(54) DETERMINING RENDERING SYSTEMS UTILIZING PRINTER LOCATIONS AND RENDERING SYSTEM ATTRIBUTES

(71) Applicant: Hewlett-Packard Development Company, L.P., Houston, TX (US)

(72) Inventors: Rajrajat Naik, Karnataka (IN); Sudhindra Venkatesh Kulkarni, Karnataka (IN); Sushant Bhattacharya, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/430,911

(22) PCT Filed: Nov. 30, 2012

(86) PCT No.: PCT/US2012/067166
§ 371 (c)(1),
(2) Date: Mar. 24, 2015

(87) PCT Pub. No.: WO2014/084839
PCT Pub. Date: Jun. 5, 2014

(65) Prior Publication Data
US 2015/0242176 A1  Aug. 27, 2015

(51) Int. Cl.
*G06F 3/12* (2006.01)
*H04L 29/08* (2006.01)

(52) U.S. Cl.
CPC .......... *G06F 3/1287* (2013.01); *G06F 3/1211* (2013.01); *G06F 3/1226* (2013.01); *G06F 3/1247* (2013.01); *G06F 3/1288* (2013.01); *H04L 67/1021* (2013.01); *H04L 67/16* (2013.01); *G06F 3/121* (2013.01)

(58) Field of Classification Search
None
See application file for complete search history.

(56) References Cited

U.S. PATENT DOCUMENTS

| 7,574,546 B2 | 8/2009 | Keeney et al. |
| 2005/0102362 A1* | 5/2005 | Price .................... G06Q 10/107 709/206 |
| 2005/0216562 A1 | 9/2005 | Armstrong et al. |
| 2007/0168514 A1 | 7/2007 | Cocotis et al. |
| 2011/0286016 A1 | 11/2011 | Lavigne et al. |
| 2011/0289440 A1 | 11/2011 | Carter et al. |

(Continued)

OTHER PUBLICATIONS

International Search Report for PCT/US2012/067166 filed Nov. 30, 2012, Mailed Apr. 12, 2013.

(Continued)

*Primary Examiner* — Neil R McLean
(74) *Attorney, Agent, or Firm* — HP Inc. Patent Department

(57) ABSTRACT

In one embodiment, a print job and an identification of a network-connected printer to print the job are received via a network. A printer location is determined for the printer. Associations of rendering computer systems with rendering system attributes are accessed or received. An identified rendering system is determined utilizing the printer location and a system attribute. The print job is sent to the identified rendering system.

18 Claims, 4 Drawing Sheets

(56) References Cited

U.S. PATENT DOCUMENTS

| | | | |
|---|---|---|---|
| 2012/0038944 A1* | 2/2012 | Jarvis | G06F 3/1204 358/1.15 |
| 2012/0057191 A1* | 3/2012 | Gnanasambandam | G06F 3/1211 358/1.15 |
| 2012/0069366 A1 | 3/2012 | Heffner et al. | |
| 2012/0233315 A1* | 9/2012 | Hoffman | G06F 9/5072 709/224 |
| 2012/0262753 A1* | 10/2012 | Viccari | H04N 1/00307 358/1.15 |
| 2013/0077127 A1* | 3/2013 | Bhatia | H04N 1/00233 358/1.15 |
| 2013/0163016 A1* | 6/2013 | Maekawa | G06K 15/402 358/1.13 |
| 2014/0002845 A1* | 1/2014 | Gutnik | G06F 21/608 358/1.14 |

OTHER PUBLICATIONS

Kailasam, S. et al., Optimizing Service Level Agreements for Autonomic Cloud Bursting Schedulers, < http://ieeexplore.ieee.org/xpl/articleDetails.jsp?tp=&arnumber=5599085&contentType=Conference+Publications&queryText%3Dcloud+printing > on pp. 285-294, Sep. 13-16, 2010.

Wang, C. et al., Ensuring Data Storage Security in Cloud Computing, < http://www.ece.iit.edu/~ubisec/IWQoS09.pdf > pp. 9, Oct. 26, 2011.

* cited by examiner

DETERMINING RENDERING SYSTEMS UTILIZING PRINTER LOCATIONS AND RENDERING SYSTEM ATTRIBUTES

BACKGROUND

Certain network-connected printers are capable of sending and receiving communications and printable content via the internet or another network without being connected to a desktop computer, notebook computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Figure 1:
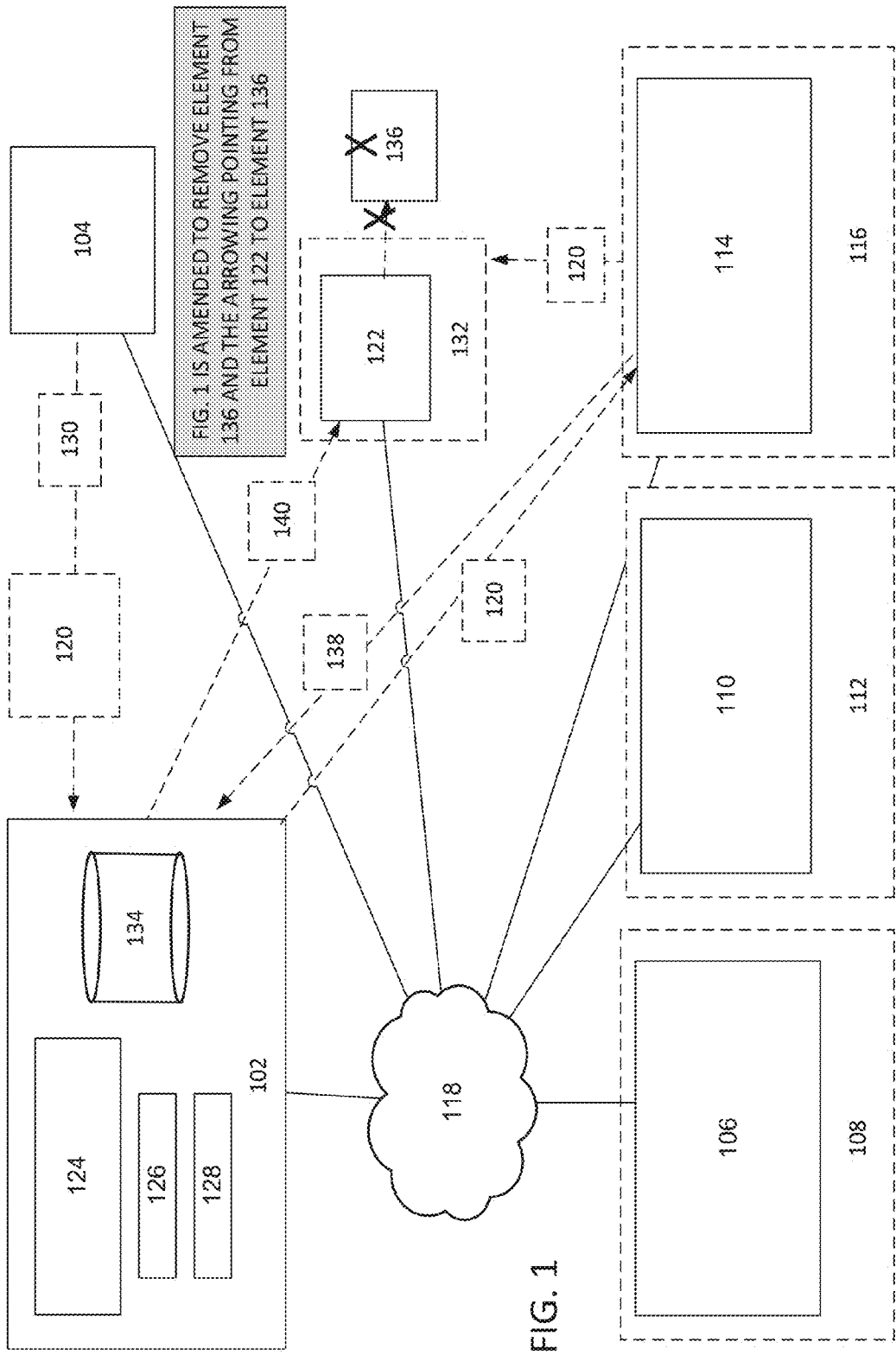
FIG. 1 is a block diagram illustrating a system according to various embodiments.

An advantage of an internet-connected printer is that content can be obtained and printed at the printer via a public cloud print service or an enterprise cloud print service, without the printer being connected to a host computing device. Another advantage is that a print job can be rendered by a rendering computing system that is a part of a public cloud print service or an enterprise cloud print service, thereby making available to the printer rendering capabilities that might not be available at the printer alone (e.g., due to a limited number of rendering options, or limited memory processing capability). A limitation to these advantages has been that the cloud print service that provides rendering functionality is typically hosted by a computer system located in a singular geography. The performance of the internet-connected printers that rely on the rendering provided by the cloud print service can vary according to the geographies involved because of this limitation. A printer located in a geography other than the geography of the cloud print service system can have higher latency for printing that will be the case when the printer is located in the same geography as the cloud print service that provides the rendering functionality. In particular, the delivery of print jobs between the cloud print service and the printers can be at significantly different speeds depending upon the geographies involved. Also, the streaming of print jobs from a cloud printing service to a network-connected printer across geographies increases the risk of content corruption and loss of delivery.

Accordingly, various embodiments described herein were developed to optimize print job delivery times and the performance of network-connected printers generally by providing the cloud print service in a distributed approach. In examples of the disclosure, a cloud print service executing upon a computing device receives, via a network, a print job and identification of a network-connected printer to print the job. The service determines a printer location for the printer, and accesses a database that includes, or receives from a second service available via the network that provides, associations of rendering computer systems with rendering system attributes. Utilizing the printer location and a system attribute from the database or the second service, the cloud print service determines an optimal rendering system from among the rendering system possibilities. After having determined the optimal rendering system, the cloud print service sends the print job to the optimal rendering system for rendering. Responsive to the cloud print service receiving a message or other data indicating the print job has been rendered at the optimal rendering system, the service sends a message to the printer. The message is a message or other data indicative that that the print job is available for retrieval from the optimal rendering system. User satisfaction with network-connected printers and cloud print services will increase as the disclosed system to determine an optimal rendering system brings about reduced latency for rendering operations, increased printing speeds, and decreased incidences of content corruption and loss.

Advantages of the disclosure include that key services of the cloud printing service, e.g. interaction with the network connected printer, can be regionalized to provide effective solutions and consistency for devices across the globe. The advantages of the disclosure also extend to optimize print job rendering hosted in a private network within the enterprise, thus providing the flexibility of providing the device an identity (e.g. an email address) over the internet while keeping the content local to the enterprise. With this solution, the experience of the users of network connected printers in multiple geographies will be more consistent and the adoption of public and private cloud printing services will increase due to the increased consistency and increased content security.

As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing. A "network-connected printer" refers to a printer that is connected to a network, to be capable of obtaining content, sending and receiving messages, accessing network content, and/or accessing applications via the network. In examples, the network may be a proprietary network, a secured network, an open network, an intranet, an extranet, or an Internet. A "public cloud print service" refers to service that enables users to send content and otherwise communicate with network connected printers via a network (e.g., the Internet) without restriction based upon user employment or other group affiliation. A "private cloud print service" refers to service that enables users to send content and otherwise communicate with network connected printers via a private network with restrictions based upon user employment, other group affiliation. "Private cloud print service" and "enterprise cloud print service" are used synonymously herein. A "private network" refers to a network designed for use exclusively by an entity and restricts, or in some examples prohibits, points of access from users external to the company. "Private network" and "enterprise network" are used synonymously herein. A "print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data. "Content" refers to text, images, and/or other subject matter or other information that can be received by a computer system for printing, and/or stored at the computer system, e.g., for later printing. A "database" refers to any organized collection of data in digital form such that it can be stored in computer memory or a data storage device. "Rendering" refers to a raster processing or other processing of content to a format that can be understood and/or better understood by a printer. A "rendering computer system" refers to a computer system that hosts a rendering service or executes software that performs a rendering function. A "rendering system attribute" refers to a trait, characteristic, or feature of a rendering system, including, but not limited to the geography the rendering system is located in, or the anticipated speed at which a print job will be rendered relative to other rendering systems.

FIG. 1 shows a first computer system 102, a job-sending computing device 104, a first rendering computer system 106 located at a first system location 108, a second rendering computer system 110 located at a second system location 112, and a third rendering computer system 114 located at a third system location 116. Each of the first computer system 102, job-sending computing device 104, first rendering computer system 106, second rendering computer system 110, and third rendering computer system 114 are electronically connected to each other via a network 118.

First computer system 102 represents generally any computing device or group of computing devices configured to send and receive network requests, send and receive data, and/or otherwise communicate with the job-sending computing device 104 and the first, second, and third rendering computer systems 106 110 114. In an example, the first computer system 102 may be a server, desktop computer, notebook computer, tablet computer, smartphone, or any other computing device.

Job-sending computing device 104 represents generally any computing device or group of computing devices configured to send and receive network requests, send and receive data, and/or otherwise communicate with the first computing device 102, including sending a print job 120. In an example, the job-sending computing device 104 may be a server, desktop computer, notebook computer, tablet computer, smartphone, or any other computing device.

First, second and third rendering computing devices 106 110 114 each represent generally a computing device or group of computing devices configured to send and receive network requests, send and receive data, and/or otherwise communicate with the first computer system 102. In examples, any of first computer system 102, job-sending computing device 104, and/or the first, second, or third rendering computer systems may be or include a server, desktop computer, notebook computer, smartphone, tablet computer, and/or any other computing device.

FIG. 1 additionally shows a network connected printer 122. The printer 122 represents generally any computing device or group of computing devices operable to produce a printed print job or printed content, and additionally operable to send and receive Internet requests, receive printable content and print jobs, and otherwise communicate, via the network 118, with the first computer system 102 and the first, second, and third rendering computer systems 106, 110 and 114 that are distinct from the first computer system 102.

Network 118 represents generally hardware components and computers interconnected by communications channels that allow sharing of resources and information. Network 118 may include a cable, wireless, fiber optic, or remote connection via a telecommunication link, an infrared link, a radio frequency link, or some combination of these, or any other connectors or systems that provide electronic communication. Network 118 may include, at least in part, an intranet, the internet, or a combination of both. Network 118 may also include intermediate proxies, routers, switches, load balancers, and the like. The paths followed by network 118 between the first computer system 102, the job-sending computing device 104, the first rendering computer 106, the second rendering computer 110, the third rendering computer 112, and the printer 122 as depicted in FIG. 1 represent the logical communication paths between these devices, not necessarily the physical paths between the devices.

Computer system 102 is shown to include a distributed print solution service ("DPSS") 124, a processor 126, and a memory 128. The DPSS 124 represents generally any combination of hardware and programming configured to enable to provide a cloud print service in a distributed approach, to optimize print job delivery times and the performance of network-connected printers. In the example of FIG. 1, the DPSS 124 executing at first computer system 102 receives, via network 118, a print job 120, and an identification 130 of the network-connected printer 122 that the print job 120 is to be sent to. In an example, the printer identification 130 may be an identification included within the print job, e.g., as metadata contained within the print job 120. In another example, the printer identification 130 may be a printer identification included within a header of an email that conveys the print job 120. In another example, the printer identification 130 may be a printer identification included within a header of an email that includes the print job 120 as an attachment.

Continuing with the example of FIG. 1, the DPSS 124 determines a printer location 132 for the printer 122. In an example, the printer location 132 may be represented as a city, county, state, country or other political geographic identifier (e.g., "California", "Orange County", or "India"). In another example, the printer location 132 may be represented as a geographic identifier (e.g., "EMEA", "Southwest", or "Americas"). In another example the printer location 132 may be represented as a numerical zone or sector, e.g., in connection with a mapping system, where cities, counties, countries, continents, regions or other geographical descriptions are assigned numerical representations.

Continuing with FIG. 1 the distributed print solution service accesses a rendering system/systems locations association database 134. In this example, the association database 134 includes a listing of rendering computer systems that are available to be accessed by the first computer system 102. The association database 134 also includes, for each of the rendering systems within the listing, at least one rendering system attribute. In an example, the rendering system attribute may include a location for the rendering system. In another example, the rendering system attribute may be an anticipated speed at which a print job will be rendered relative to other rendering systems. In another example, the rendering system attribute may include or be another trait, characteristic, or feature of the rendering system.

Continuing with the example of FIG. 1, the DPSS 124 next determines, utilizing the printer location 132 and a system attribute, an optimal rendering system for rendering the print job 120. In the example of FIG. 1 the DPSS determines via accessing the association database 134, that the third rendering computer system 114, located at the third system location 116, is the optimal rendering system to be used as it is the nearest geographically to the printer 122. In another example, the DPSS may, using association information stored in the database 134, determine an optimal rendering computer system according to other system attributes, e.g. processing capabilities, or the estimated speed at which a print job can be rendered at each of the available rendering systems.

After identifying the optimal rendering system, the DPSS 124 sends the print job 120 to the identified optimal rendering system. The optimal rendering system (in this example the third rendering computer system 114) renders the print job 120, and then the optimal rendering computer system 114 sends to the first computer 102, via the network 118, a message or other render completion data 138 that indicates that the print job 120 has been rendered. Responsive to receipt of the render completion data 138 at the first computer 102, the DPSS 124 sends to the printer 122, via the network 118, a message 140 indicative that that the print job 120 is available at the optimal rendering system for retrieval by the printer 122.

In examples, the DPSS 124 may receive the print job 120 from the job-sending computing device 204, and may send the print job 120 to the identified optimal rendering computer 114, over the network 118 via a networking protocol, including but not limited to Transmission Control Protocol/Internet Protocol ("TCP/IP"), HyperText Transfer Protocol ("HTTP"), and/or Session Initiation Protocol ("SIP"). In examples, the DPSS 124 may receive the render completion data 138 from the optimal rendering computer 114, and/or send the job available message to the printer 122, over the network 118 via an internet messaging protocol, including but not limited to an Extensible Messaging and Presence Protocol ("XMPP").

The functions and operations described with respect to printer identifier validation service 124 and first computer system 102 may be implemented as a non-transitory computer-readable storage medium containing instructions executed by a processor (e.g., processor 126) and stored in a memory (e.g., memory 128). In a given implementation, processor 126 may represent multiple processors, and memory 128 may represent multiple memories. Processor 126 represents generally any instruction execution system, such as a computer/processor based system or an ASIC (Application Specific Integrated Circuit), a computer, or other system that can fetch or obtain instructions or logic stored in memory 128 and execute the instructions or logic contained therein. Memory 128 represents generally any memory configured to store program instructions and other data.

Figure 2:
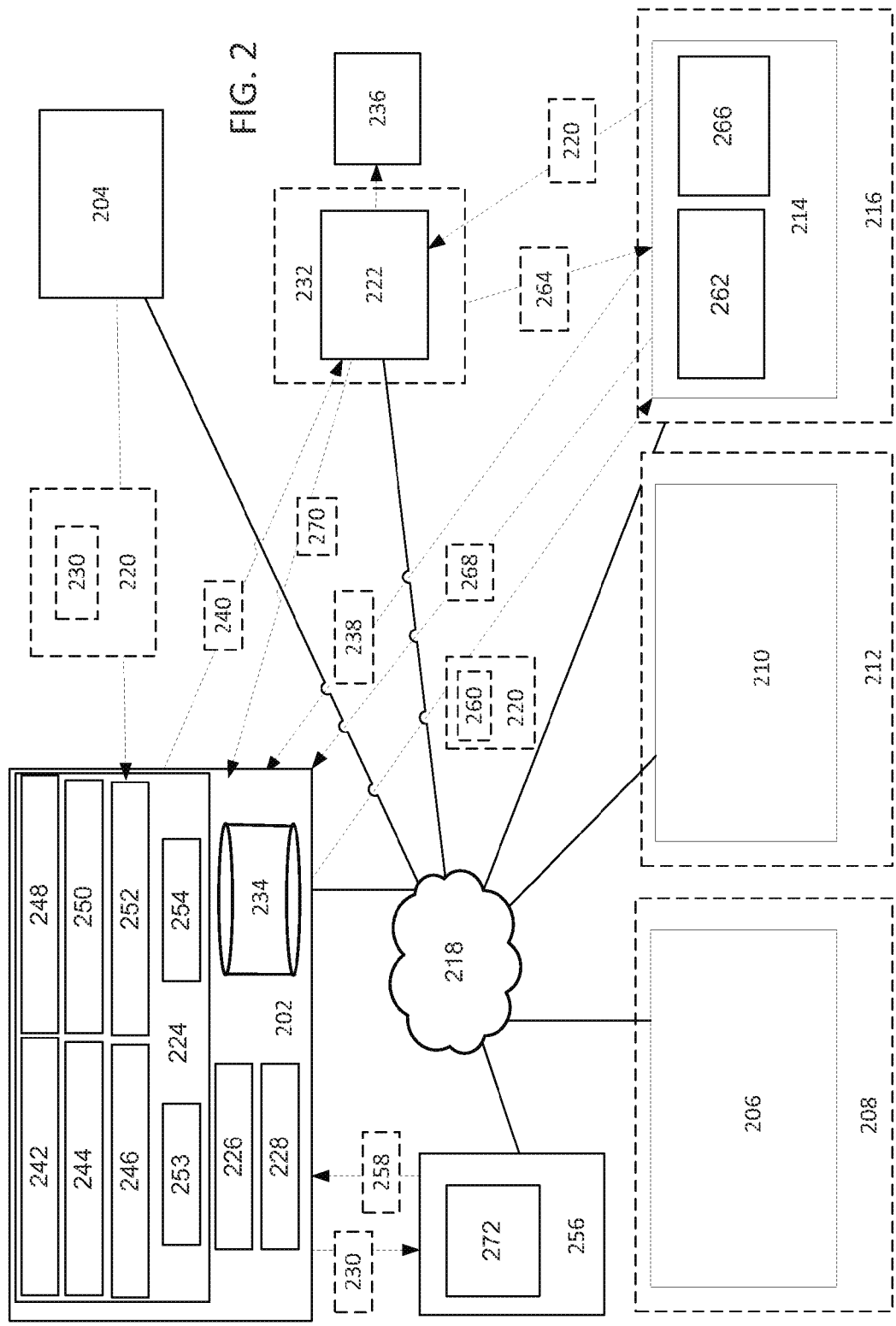
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a first computer system 202, a job-sending computing device 204, a first rendering computer system 206 located at a first system location 208, a second rendering computer system 210 located at a second system location 212, and a third rendering computer system 214 located at a third system location 216. Each of the first computer system 202, job-sending computing device 204, first rendering computer system 206, second rendering computer system 210, and third rendering computer system 214 is electronically connected to each other via an internet 218.

First computer system 202 represents generally any computing device or group of computing devices configured to send and receive network requests, send and receive data, and/or otherwise communicate with the job-sending computing device 204 and the first, second, and third rendering computer systems 206 210 214. Job-sending computing device 204 represents generally any computing device or group of computing devices configured to send and receive network requests, send and receive data, and/or otherwise communicate with the first computing device 202, including sending a print job 220. First, second and third rendering computing devices 206 210 214 each represent generally a computing device or group of computing devices configured to send and receive network requests, send and receive data, and/or otherwise communicate with the first computer system 202, and to host rendering services. In examples, any of first computer system 202, job sending computing device 204, and/or the first, second, or third rendering computer systems 206 210 214 may be or include a server, desktop computer, notebook computer, mobile device, tablet computer, and/or any other computing device.

FIG. 2 additionally shows a network connected printer 222. The printer 222 represents generally any computing device or group of computing devices operable to produce a printed print job or printed content, and additionally operable to send and receive internet requests, receive printable content and print jobs, and otherwise communicate, via the internet 218, with the first computer system 202 and the first, second, and third rendering computer systems 206, 210 and 214 that are distinct from the first computer system 202.

Internet 218 represents generally hardware components and computers interconnected by communications channels that allow sharing of resources and information over an internet or intranet network, or over a combination of both. Internet 218 may include a cable, wireless, fiber optic, or remote connection via a telecommunication link, an infrared link, a radio frequency link, or some combination of these, or any other connectors or systems that provide electronic communication. Internet 218 may also include intermediate proxies, routers, switches, load balancers, and the like. The paths followed by internet 218 between the first computer system 202, first rendering computer system 206, second rendering computer system 210, third rendering computer system 214, and printer 222 as depicted in FIG. 2 represent the logical communication paths between these devices, not necessarily the physical paths between the devices.

Computer system 202 is shown to include a distributed print solution service ("DPSS") 224, a processor 226, and a memory 228. The DPSS 224 in the example of FIG. 2 represents generally any combination of hardware and programming configured to enable to provide a public cloud print service in a distributed approach, to optimize print job delivery times and the performance of network-connected printers. The DPSS 224 includes a job receipt module 242, a print location module 244, an optimal rendering system module 246, a job sending module 248, a rendering confirmation module 250, a retrieval message module 252, a retrieval confirmation module 253, and a print confirmation module 254. Processor 226 represents generally any instruction execution system, such as a computer/processor based system or an ASIC (Application Specific Integrated Circuit), a computer, or other system that can fetch or obtain instructions or logic stored in memory 228 and execute the instructions or logic contained therein. Memory 228 represents generally any memory configured to store program instructions and other data.

In the example of FIG. 2, the job receipt module 242 executing at the first computer system 202 receives, via internet 218, a print job 220. In an example, the print job 220 includes, as metadata contained within the print job 220, data 230 that identifies a network-connected printer 222 to which the job 220 is being sent.

Responsive to the job receipt module's 242 receipt of the print job 220, the print location module 244 determines a printer location 232 for the printer 222. In this example, the print location module 244 sends printer identification data 230, via the internet 218, to a printer identification service 272 executing at a printer identification computer system 256 distinct form the first computer system 202. Responsive to receipt of the print identification data 230, the printer identification service 272 sends to the first computer system 202, and the print location module 244 receives, location data 258 for the printer 222. In this example, the printer location module 244 then interprets the received location data 258 to determine that "EMEA" is the location for the printer 222. In another example, the printer identification service 258 may be hosted by a computing device that is included within the first computer system 202.

Continuing with the example of FIG. 2, the optimal rendering system module 246 next accesses a rendering system/systems locations association database 234. In this example, the association database 234 includes a listing of rendering computer systems that are available to be accessed by the first computer system 202. The association database 234 also includes, for each of the rendering systems within the listing at least one rendering system attribute. In this example, the rendering system attribute includes a location for the rendering systems. We can assume for this example that the first rendering computer system 206 has a system location 208 of India, the second rendering computer system 210 has a system location 212 of Brazil, and the third rendering computer system 214 has a system location 216 of EMEA.

Continuing with FIG. 2, the optimal rendering system module 246 next determines an optimal rendering system for rendering the print job 220, utilizing the EMEA printer location 232 and the rendering system attributes of the locations of the available rendering systems 208 212 216. In this example, the optimal rendering system module 246 determines, via accessing the association database 234, that the third rendering computer system 214 located at the EMEA system location 216 is the optimal rendering system as it is the available rendering computer system geographically nearest to the printer 222.

After the optimal rendering system module 256 has identified the optimal rendering system, the job sending module 258 sends the print job 220 to the identified optimal rendering system (the third rendering computer system 214 at the EMEA system location 216). In this example, the job sending module 248 sends the print job 220 to the third rendering computer system 214 via the internet 218 utilizing a HTTP protocol. In this example, the job sending module 248 takes an additional step of analyzing the print job 220 to determine rendering instructions for the print job 220, and sends the rendering instructions 260 to the identified optimal rendering system 214. In an example, the rendering instructions 260 determined by the job sending module 248 may be sent to the optimal rendering system by including the instructions in the print job 220. In another example, the rendering instructions 260 may be sent to the optimal rendering system 214 separate from the print job 220 (e.g. via a separate internet communication according to an HTTP or XMPP protocol).

Next, a distributed rendering service 262 at the third rendering computer system 214 (that was identified as the optimal rendering system) renders the print job 220. After the rendering, the optimal rendering computer system 214 sends the rendered print job 220 to the printer 222 via the internet 218. In an example, the distributed rendering service 262 sends the print job 220 to the printer 222 utilizing a HTTP protocol.

In this example, the optimal rendering computer system 214 that renders the print job 222 sends to the first computer system 202, via the internet 218, a message or other render-completion data 238 that indicates that the print job 220 has been rendered. In an example, this message is sent via an XMPP protocol. Responsive to receipt of the render completion data 238 by a rendering confirmation module 250 executing at the first computer 202, the retrieval message module 252 sends to the printer 222, via the internet 218, a job-available message 240 indicative that that the rendered print job 220 is available at the optimal rendering system 214 for retrieval by the printer 222.

Responsive to the receipt of the job available message 240 from the first computer system 202, the printer 222 sends a job pull request 264 to the identified optimal rendering computer system 214. A job-pull service 266 executing at the optimal third rendering computer system 214 receives the request, and in turn send the rendered print job 220 to the printer, via the internet and utilizing a XMPP protocol. In an embodiment, the optimal third rendering computer system 214 sends to the first computer system 202, via the internet 218 and according to a XMPP protocol, a message or other retrieval data 268 indicative that the print job 220 has been retrieved by the printer 222, and a retrieval confirmation module 253 executing at first computer system 202 receives the retrieval data 268.

Upon receipt of the print job 220 from the optimal rendering computer system 214, the printer 222 prints the print job 220 upon a media to create a printed output 236. In an example, after printing the print job 220 to create the printed output 236, the printer 222 sends to the first computer 202 via the network 218 and a XMPP protocol, and the print confirmation module 254 receives, a message or other print job completion data 270 that indicates that the print job 220 has been printed at the printer 222.

The functions and operations described with respect to the distributed print solution service 224 and the first computer system 202 may be implemented as a non-transitory computer-readable storage medium containing instructions executed by a processor (e.g., processor 226) and stored in a memory (e.g., memory 228). In a given implementation, processor 226 may represent multiple processors, and memory 228 may represent multiple memories. Processor 226 represents generally any instruction execution system, such as a computer/processor based system or an ASIC (Application Specific Integrated Circuit), a computer, or other system that can fetch or obtain instructions or logic stored in memory 228 and execute the instructions or logic contained therein. Memory 228 represents generally any memory configured to store program instructions and other data.

Figure 3:
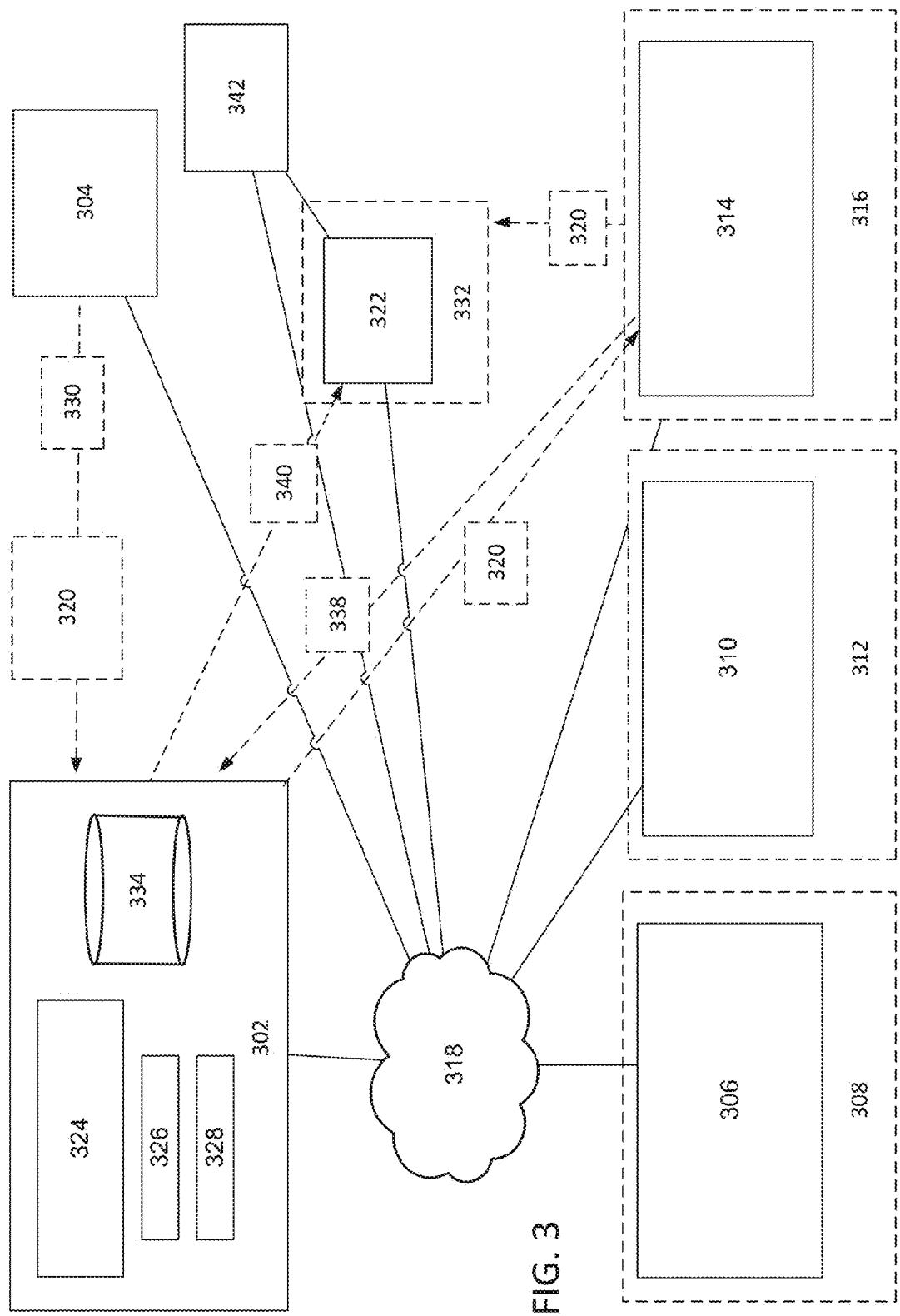
FIG. 3 is a block diagram illustrating a system according to various embodiments.

FIG. 3 shows a first computer system 302, a job-sending computing device 304, a first rendering computer system 306 located at a first system location 308, a second rendering computer system 310 located at a second system location 312, and a third rendering computer system 314 located at a third system location 316. Each of the first computer system 302, job-sending computing device 304, first rendering computer system 306, second rendering computer system 310, and third rendering computer system 314 are electronically connected to each other via a network 318.

Computer system 302 is shown to include a distributed print solution service ("DPSS") 324, a processor 326, and a memory 328. The DPSS 324 in the example of FIG. 3 represents generally any combination of hardware and programming configured to enable to provide a private cloud print service in a distributed approach, to optimize print job delivery times and the performance of network-connected printers. In the example of FIG. 3, the DPSS 324 executing at first computer system 302 receives, via network 318, a print job 320, and an identification 330 of the network-connected printer 322 that the print job 320 is to be sent to.

The DPSS 324 determines a printer location 332 for the printer 322, and that the printer 322 is connected to a private network 342. After making these determinations, the DPSS 324 accesses a rendering system/systems locations association database 334. In this example, the association database 334 includes a listing of rendering computer systems that are available to be accessed by the first computer system 302. The association database 334 also includes, for each of the rendering systems within the listing, information as to the eligibility of the rendering computer systems to interact with the private network 342, and at least one rendering system attribute. In an example, the rendering system attribute may include a location for the rendering system. In another example, the rendering system attribute may be an anticipated speed at which a print job will be rendered relative to other rendering systems.

Continuing with the example of FIG. 3, the DPSS 324 next determines, utilizing the printer location 332, the information as to the eligibility of the rendering computing systems to interact with the private network, and the rendering system attribute, an optimal rendering system for rendering the print job 320. In the example of FIG. 3, the DPSS determines via accessing the association database 334, that the third rendering computer system 314, located at the third system location 316, is the optimal rendering system to be used as it is a rendering system that is eligible to interact with the private network 342 that includes the printer 322, and it is the rendering system that is nearest geographically to the printer 322. In another example, the DPSS may, using association information stored in the database 334, determine from a set of rendering computer systems that are eligible to interact with the private network 342, an optimal rendering computer system according to other system attributes, e.g. processing capabilities, or the estimated speed at which a print job can be rendered at each of the available rendering systems.

After identifying the optimal rendering system, the DPSS 324 sends the print job 320 to the identified optimal rendering system. The optimal rendering system (in this example the third rendering computer system 314) renders the print job 320, and then the optimal rendering computer system 314 sends to the first computer 302, via the network 318, a message or other render completion data 338 that indicates that the print job 320 has been rendered. Responsive to receipt of the render completion data 338 at the first computer 302, the DPSS 324 sends to the printer 322, via the network 318, a message 340 indicative that that the print job 320 is available at the optimal rendering system for retrieval by the printer 322.

The functions and operations described with respect to printer identifier validation service 324 and first computer system 302 may be implemented as a non-transitory computer-readable storage medium containing instructions executed by a processor (e.g., processor 326) and stored in a memory (e.g., memory 328). In a given implementation, processor 326 may represent multiple processors, and memory 328 may represent multiple memories. Processor 326 represents generally any instruction execution system, such as a computer/processor based system or an ASIC (Application Specific Integrated Circuit), a computer, or other system that can fetch or obtain instructions or logic stored in memory 328 and execute the instructions or logic contained therein. Memory 328 represents generally any memory configured to store program instructions and other data.

Figure 4:
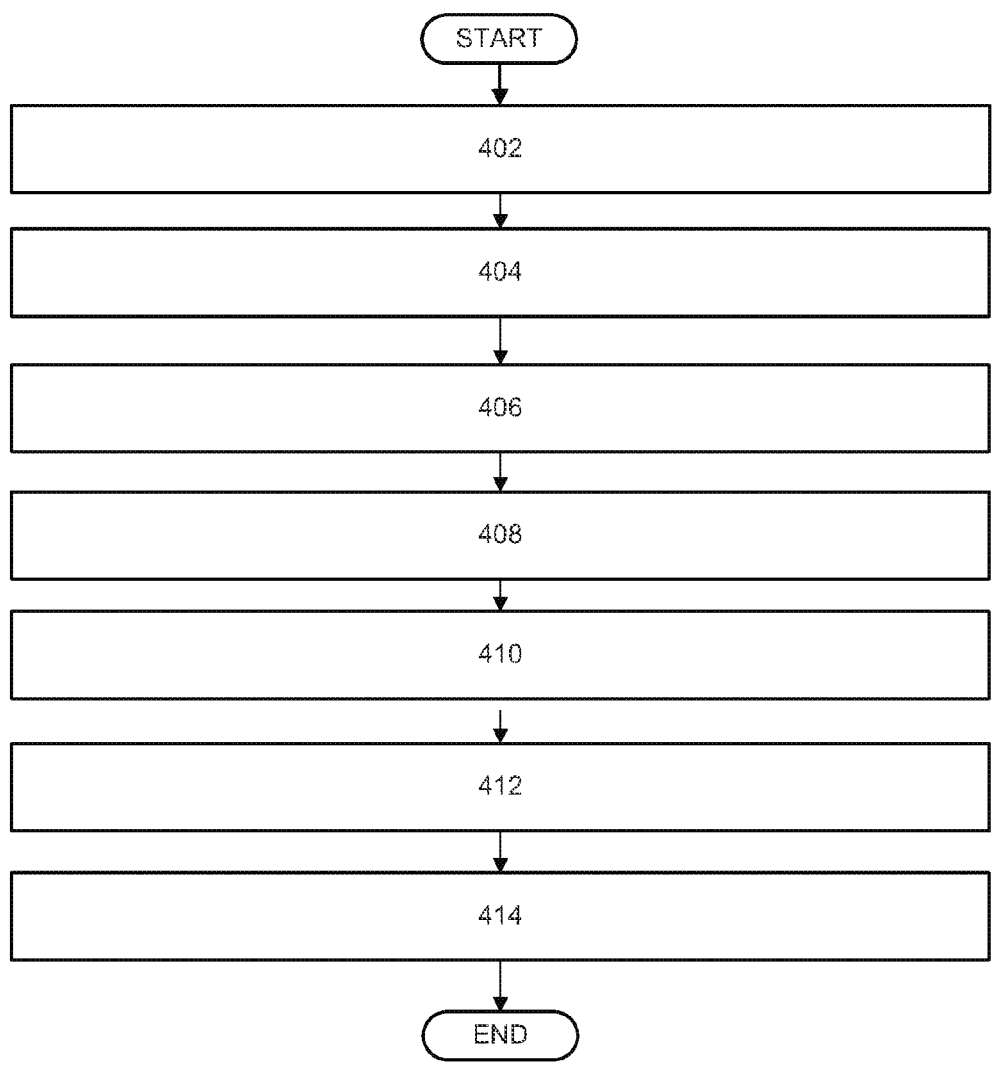
FIG. 4 is a flow diagram depicting steps taken to implement various embodiments.

FIG. 4 is a flow diagram of operation in a system according to various embodiments. In discussing FIG. 4, reference may be made to the diagrams of FIG. 2 to provide contextual examples. Implementation, however, is not limited to those examples. Starting with FIG. 4, a print job and identification of a network-connected printer to print the job are received via a network (block 402). Referring back to FIG. 2, job receipt module 242 may be responsible for implementing block 402.

Continuing with FIG. 4, a printer location for the printer is determined (block 404). Referring back to FIG. 2, printer location module 244 may be responsible for implementing block 404.

Continuing with FIG. 4, associations of rendering computer systems with system attributes are accessed at a database or received from a network-available service (block 406). Referring back to FIG. 2, optimal rendering system module 246 may be responsible for implementing block 406.

Continuing with FIG. 4, an optimal rendering system is determined utilizing the printer location and a system attribute (block 408). Referring back to FIG. 2, optimal rendering system module 246 may be responsible for implementing block 408.

Continuing with FIG. 4, the print job is sent to the optimal rendering system (block 410). Referring back to FIG. 2, job sending module 248 may be responsible for implementing block 410.

Continuing with FIG. 4, data is received. The data is indicative that the print job has been rendered at the optimal rendering system (block 412). Referring back to FIG. 2, rendering confirmation module 250 may be responsible for implementing block 412.

Continuing with FIG. 4, a message is sent to the printer. The message is indicative that that the print job is available for retrieval from the optimal rendering system (block 414). Referring back to FIG. 2, retrieval message module 252 may be responsible for implementing block 414.

Various modifications may be made to the disclosed embodiments and implementations without departing from their scope. Therefore, the illustrations and examples herein should be construed in an illustrative, and not a restrictive, sense.

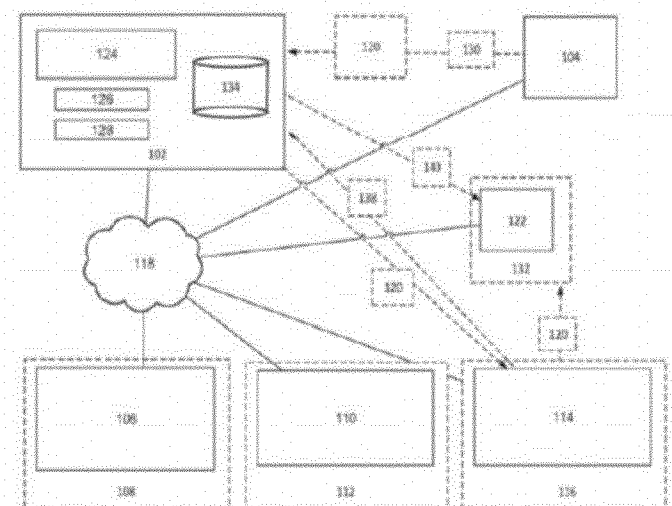

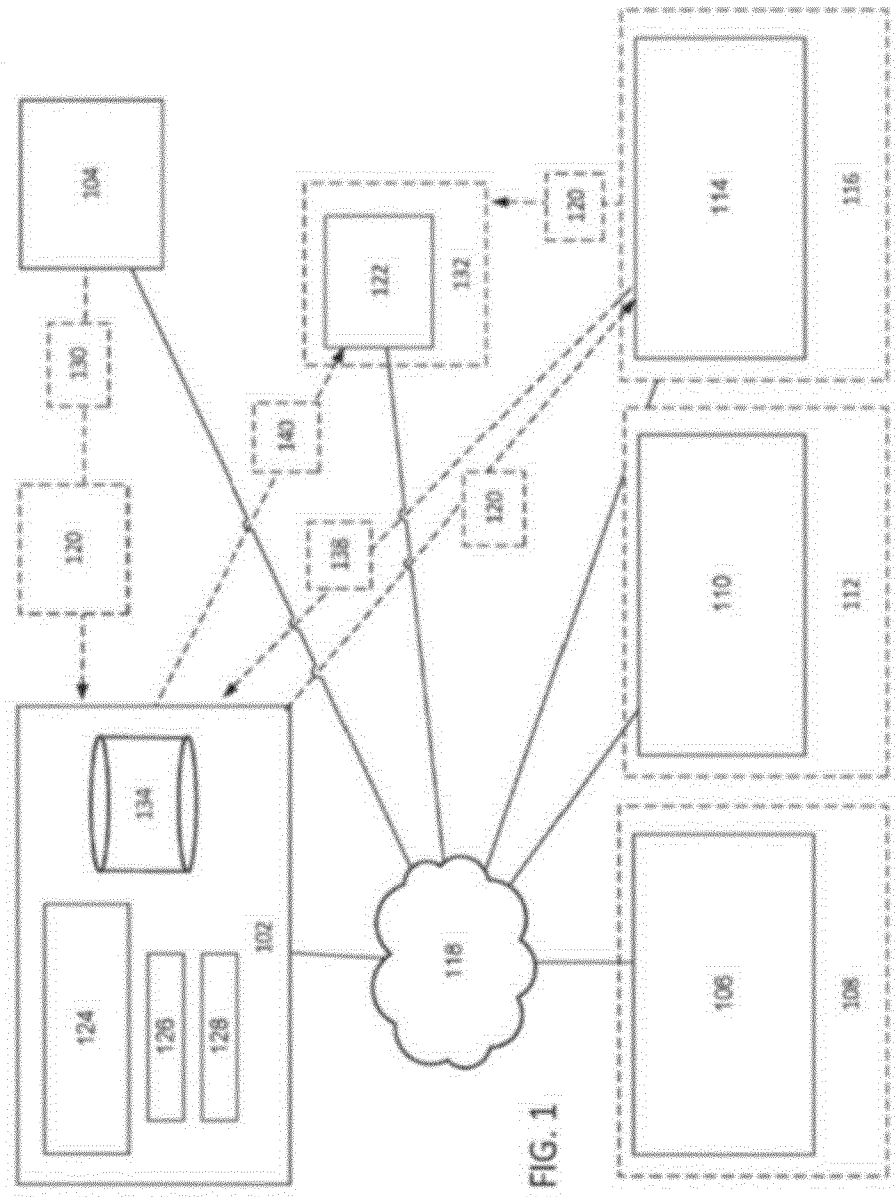

What is claimed is:

1. A non-transitory computer-readable storage medium containing instructions, the instructions when executed by a processor causing the processor to:

receive, via a network, a print job and identification of a printer to print the print job;

determine a location of the printer;

select one of a plurality of rendering computer systems as an identified rendering system to render the print job into a printing format for the printer, wherein, to select one of the rendering computer systems as the identified rendering system to render the print job, the instructions are to cause the processor to:

access a database for information of attributes of the rendering computer systems, wherein the attributes include information relating to projected response times of the rendering computer systems, and select the identified rendering system to render the print job into the printing format based on the location of the printer and the projected response times of the rendering computer systems;

send the print job to the identified rendering system for rendering the print job into the printing format; and in response to a receipt of a render completion notice from the identified rendering system, send a message to the printer to indicate that the print job in the printing format is available at the identified rendering system for the printer to retrieve and print.

2. The non-transitory computer-readable storage medium of claim 1, wherein the identified rendering system is the rendering system nearest the printer.

3. The non-transitory computer-readable storage medium of claim 1, wherein the instructions are to cause the processor to determine that the printer is connected to a private network, and wherein to select the identified rendering system, the instructions are to cause the processor to confirm that the identified rendering system is eligible to interact with the private network.

4. The non-transitory computer-readable storage medium of claim 1, wherein the message is sent to the printer via an instant messaging protocol.

5. The non-transitory computer-readable storage medium of claim 1, wherein the message is sent via an XMPP protocol.

6. The non-transitory computer-readable storage medium of claim 1, wherein the printer location is received from a printer identification service executing at a computer system.

7. The non-transitory computer-readable storage medium of claim 1, wherein the printer location is specified in the print job.

8. The non-transitory computer-readable storage medium of claim 1, wherein the instructions are to cause the processor to receive data from the identified rendering system indicative that the print job has been retrieved by the printer.

9. The non-transitory computer-readable storage medium of claim 1, wherein the instructions are to cause the processor to receive data from the printer indicative that the print job has been printed at the printer.

10. The non-transitory computer-readable storage medium of claim 1, wherein the instructions are to cause the processor to analyze the print job to determine rendering instructions, and send the rendering instructions to the identified rendering system.

11. The non-transitory computer-readable storage medium of claim 10, wherein the rendering instructions are included within the print job.

12. The non-transitory computer-readable storage medium of claim 1, wherein one of the attributes of the rendering computer systems is processing capability.

13. The non-transitory computer-readable storage medium of claim 1, wherein one of the attributes of the rendering computer systems is estimated speed at which a print job can be rendered.

14. A system, comprising:

a memory storing instructions; and a processor to execute the instructions stored in the memory to cause the processor to:

receive via a network a print job and identification of a network-connected printer to print the print job;

determine a location of the printer;

access a database storing information of rendering computer systems with rendering system attributes;

select one of the rendering computer system as an identified rendering system to render the print job into a printing format for the printer, wherein, to select one of the rendering computer systems as the identified rendering system to render the print job, the instructions are to cause the processor to:

access a database for information of attributes of the rendering computer systems, wherein the attributes include information relating to projected response times of the rendering computer systems, and select the identified rendering system to render the print job into the printing format based on the location of the printer and the projected response times of the rendering computer systems;

send the print job to the identified rendering system for rendering the print job into the printing format;

receive data indicative that the print job has been rendered into the printing format at the identified rendering system; and send to the printer a message indicative that the print job is available at the identified rendering system for the printer to retrieve and print.

15. The system of claim 14, wherein the identified rendering system is the rendering system nearest the printer.

16. The system of claim 14, wherein the attributes of the rendering computer systems include processing capability and estimated speed at which a print job can be rendered.

17. A method, comprising:

receiving from a first network-connected computing device, a print job and an identification of a network-connected printer to print the print job;

determine, by a processor, a location of the printer;

accessing, by the processor, a database that associate rendering computer systems with rendering system attributes;

selecting, by the processor, one of the rendering computer systems as an identified rendering system to render the print job into a printing format for the printer, including:

accessing a database for information of attributes of the rendering computer systems, wherein the attributes include information relating to projected response times of the rendering computer systems, and select the identified rendering system to render the print job into the printing format based on the location of the printer and the projected response times of the rendering computer systems;

sending, by the processor, the print job to the identified rendering system for rendering the print job into the printing format;

receiving a message from the identified rendering system indicating that the print job has been rendered into the printing format; and sending, by the processor, a message to the printer informing that the print job is available at the rendering system for the printer to retrieve and print.

18. The method of claim 17, wherein the attributes of the rendering computer systems include processing capability and estimated speed at which a print job can be rendered.

* * * * *

UNITED STATES PATENT AND TRADEMARK OFFICE
CERTIFICATE OF CORRECTION

| | |
|---|---|
| PATENT NO. | : 9,760,327 B2 |
| APPLICATION NO. | : 14/430911 |
| DATED | : September 12, 2017 |
| INVENTOR(S) | : Rajrajat Naik et al. |

It is certified that error appears in the above-identified patent and that said Letters Patent is hereby corrected as shown below:

Delete the title page and substitute therefore with the attached title page consisting of the corrected illustrative figure.

Please replace FIG. 1 with FIG. 1 as shown on the attached page.

In Column 12, Line 47, in Claim 17, delete "associate" and insert -- associates --, therefor.

Signed and Sealed this
Tenth Day of September, 2019

Andrei Iancu
*Director of the United States Patent and Trademark Office*

(12) United States Patent
Naik et al.

(10) Patent No.: US 9,760,327 B2
(45) Date of Patent: Sep. 12, 2017

(54) DETERMINING RENDERING SYSTEMS UTILIZING PRINTER LOCATIONS AND RENDERING SYSTEM ATTRIBUTES

(71) Applicant: Hewlett-Packard Development Company, L.P., Houston, TX (US)

(72) Inventors: Rajrajat Naik, Karnataka (IN); Sudhindra Venkatesh Kulkarni, Karnataka (IN); Sushant Bhattacharya, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/430,911

(22) PCT Filed: Nov. 30, 2012

(86) PCT No.: PCT/US2012/067166
§ 371 (c)(1),
(2) Date: Mar. 24, 2015

(87) PCT Pub. No.: WO2014/084839
PCT Pub. Date: Jun. 5, 2014

(65) Prior Publication Data
US 2015/0242176 A1    Aug. 27, 2015

(51) Int. Cl.
*G06F 3/12* (2006.01)
*H04L 29/08* (2006.01)

(52) U.S. Cl.
CPC ......... *G06F 3/1287* (2013.01); *G06F 3/1211* (2013.01); *G06F 3/1226* (2013.01); *G06F 3/1247* (2013.01); *G06F 3/1288* (2013.01); *H04L 67/1021* (2013.01); *H04L 67/16* (2013.01); *G06F 3/121* (2013.01)

(58) Field of Classification Search
None
See application file for complete search history.

(56) References Cited

U.S. PATENT DOCUMENTS

| | | |
|---|---|---|
| 7,574,546 B2 | 8/2009 | Keeney et al. |
| 2005/0102362 A1* | 5/2005 | Price .................. G06Q 10/107 709/206 |
| 2005/0216562 A1 | 9/2005 | Armstrong et al. |
| 2007/0168514 A1 | 7/2007 | Cocotis et al. |
| 2011/0286016 A1 | 11/2011 | Lavigne et al. |
| 2011/0289440 A1 | 11/2011 | Carter et al. |

(Continued)

OTHER PUBLICATIONS

International Search Report for PCT/US2012/067166 filed Nov. 30, 2012, Mailed Apr. 12, 2013.

(Continued)

*Primary Examiner* — Neil R McLean
(74) *Attorney, Agent, or Firm* — HP Inc. Patent Department

(57) ABSTRACT

In one embodiment, a print job and an identification of a network-connected printer to print the job are received via a network. A printer location is determined for the printer. Associations of rendering computer systems with rendering system attributes are accessed or received. An identified rendering system is determined utilizing the printer location and a system attribute. The print job is sent to the identified rendering system.

18 Claims, 4 Drawing Sheets